UNITED STATES PATENT OFFICE.

LUDWIG WEISS, OF BUDAPEST, AUSTRIA-HUNGARY.

BINDING AGENT AND PROCESS OF FORMING SAME.

No. 814,490.

Specification of Letters Patent.

Patented March 6, 1906.

Application filed March 18, 1904. Serial No. 198,827.

*To all whom it may concern:*

Be it known that I, LUDWIG WEISS, civil engineer, a subject of the Emperor of Austria-Hungary, residing at 37–39 József Körút VIII, in the city of Budapest, Empire of Austria-Hungary, have invented certain new and useful Improvements in Binding Agents and Processes of Forming Same, of which the following is a full, clear, and exact specification.
My invention relates to binding agents or cements and processes of making same, by means of which binding agents or cements suitable pulverulent materials — such as brown coal, pit-coal, charcoal, coke-dust, sand, broken stones, or other suitable substances of mineral origin—as, for instance, pounded and pulverized or comminuted iron or other ore and incombustible fireproof materials—can be united to hard pieces in a cold state.

Hitherto amorphous magnesite, which when burned and combined with chlorid of magnesium forms the known Sorrel cement, was employed for making a binding agent.
This binding agent meets the requirements, but since amorphous magnesite is only very seldom found to be of workable thickness the cement made therefrom is only used by way of exception on account of its high price, and besides the chlorid of magnesium also corrodes the iron. The sulfate of calcium—gypsum—likewise used as a binding agent has only a slight binding power, for which reason it cannot give any satisfactory results even when used in large quantities, because it is not weatherproof.

The binding agent made according to the process forming the subject-matter of this invention is free from the above-mentioned drawbacks, since it can be made cheaper than any known binding agent.

The process forming the subject-matter of this invention consists, essentially, in the fact that the mixture of a calcium and magnesium salt (chiefly the mixture of the carbonates of the two mentioned metals) is converted into sulfate of calcium and magnesium by means of sulfuric acid. For this purpose dolomite is preferably used. Since, however, the calcium and magnesium contents of the dolomite vary according to the place where it is found, the proportion of both carbonates is regulated by adding limestone or magnesite until it reaches the chemical value requisite for making this binding agent. The most suitable proportion is approximately as follows—viz., two hundred parts in all, divided, by weight, into one hundred parts of dolomite, fifty parts of calcium carbonate, and fifty parts of carbonate of magnesium. The use of dolomite is supported by the fact that dolomite is generally employed as raw material in the carbonic-acid industry and in soda-water works. The waste accumulating in those branches of industry consists of sulfate of calcium and magnesium, is of no use for said industry, and can therefore be advantageously utilized as a binding agent. The liquid of the pulpy substance obtained by the decomposition and chiefly consisting of dissolved sulfate of magnesium and a small percentage of sulfate of calcium is separated from the solid portion of the residues and can be used as a binding agent. The remaining solid portion of the residues is then dried at a high temperature—say, at about a dull-red heat—in a mixing-drum or drying-chamber, the previously pulpy material being converted into solid pieces. A portion of the solid pieces thus produced is now made red-hot, whereupon the dried as well as the burned portion is ground to a fine powder. This powder is now mixed in a dry state with the material to be united, and for the purpose of producing the hardening according to the nature of the material to be combined the said mixture is moistened with ordinary water or steam or with the liquid separated from the pulp. If the waste of the carbonic-acid or soda-water works is not sufficient, magnesite or dolomite is burned and converted into the corresponding oxids, ground after cooling, and the powder thus produced is mixed with the liquid separated from the above-mentioned pulp and chiefly consisting of dissolved sulfate of magnesium and a small percentage of calcium, thereby producing a binding agent which also contains hydrate of magnesium and calcium. If the said binding agent is to be used for making coal or coke briquets, about two to four per cent. of the binding agent is added to the coal or coke dust, which quantity suffices for effecting a hardening of the form-pieces pressed out of the mixture at a temperature of 18° to 20° within a few hours and for converting the same into combustible solid pieces. The briquets thus made do not fall to pieces in the fire. The binding agent used does not give rise to the development of soot, smoke, or smell, and is water and weather proof. A preliminary drying or heating of the coal or coke is unnecessary. Similar steps may be taken when making artificial stones, except that the binding agent only amounts to eight to ten per cent. of the raw material employed, and when making carvings the correspondingly-diluted material is cast in molds. For combining the pounded ore the liquid can be employed which is separated from the pulp produced from the decomposed dolomite.

Having now particularly described and ascertained the nature of my said invention and in what manner the same is to be performed, I declare that what I claim is—

1. The hereinbefore-described process of forming a binding agent for pulverulent substances, consisting in decomposing a mixture of carbonates of calcium and magnesium by sulfuric acid, drying the product obtained, burning a portion thereof, and thoroughly mixing the burned with the unburned powder, whereby a product results which when moistened solidifies in a solid substance at an ordinary temperature, substantially as described and for the purpose set forth.

2. The hereinbefore-described process of forming a binding agent which consists in decomposing by sulfuric acid a total mixture of two hundred parts composed of one hundred parts by weight of dolomite, fifty parts calcium carbonate, and fifty parts carbonate of magnesium, drying the decomposed precipitated products, burning a portion of the precipitated products, and mixing the unburned and burned portions together, whereby a product results which when moistened solidifies in a solid substance at an ordinary temperature, substantially as described and for the purpose set forth.

3. A binding agent composed of a mixture of salts of calcium and magnesium and carbonates of the said metals decomposed by sulfuric acid which have been dried, and a portion burned and again mixed with the unburned residue.

4. A binding agent composed of a mixture of decomposed salts of calcium and magnesium and carbonates of the said metals which have been dried, and a portion burned and again mixed with the unburned residues.

5. A binding agent composed of one hundred parts by weight of decomposed dolomite, fifty parts decomposed calcium carbonate, and fifty parts decomposed carbonate of magnesium, a portion only of which is burned.

6. A binding agent, composed of decomposed dolomite and decomposed carbonate of magnesium, a portion only of which is burned.

7. The hereinbefore-described process of forming a binding agent for pulverulent substances, consisting in decomposing a mixture of calcium and magnesium carbonate, drying the mixture, burning a portion thereof and thoroughly mixing the burned with the unburned powder, whereby a product results which when moistened solidifies in a solid substance at an ordinary temperature, substantially as described and for the purpose set forth.

In witness whereof I have hereunto set my hand in presence of two witnesses.

LUDWIG WEISS.

Witnesses:
 JACOB KARMÁRL,
 LOUIS NARIDORY.